US012084308B2

(12) United States Patent
Williams et al.

(10) Patent No.: US 12,084,308 B2
(45) Date of Patent: Sep. 10, 2024

(54) SUPER GROUP ARCHITECTURE WITH ADVANCED BUILDING WIDE DISPATCHING LOGIC—DISTRIBUTED GROUP ARCHITECTURE

(71) Applicant: OTIS ELEVATOR COMPANY, Farmington, CT (US)

(72) Inventors: Daniel S. Williams, Southington, CT (US); Jannah A. Stanley, Portland, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 1446 days.

(21) Appl. No.: 16/522,911

(22) Filed: Jul. 26, 2019

(65) Prior Publication Data

US 2020/0039783 A1 Feb. 6, 2020

Related U.S. Application Data

(60) Provisional application No. 62/712,348, filed on Jul. 31, 2018.

(51) Int. Cl.
*B66B 1/24* (2006.01)
*B66B 1/28* (2006.01)
(Continued)

(52) U.S. Cl.
CPC .............. *B66B 1/2458* (2013.01); *B66B 1/28* (2013.01); *B66B 1/3446* (2013.01); *B66B 1/468* (2013.01);
(Continued)

(58) Field of Classification Search
CPC ....... B66B 1/2458; B66B 1/28; B66B 1/3446; B66B 1/468; B66B 3/002;
(Continued)

(56) References Cited

U.S. PATENT DOCUMENTS 5,183,981 A 2/1993 Thangavelu
5,304,752 A 4/1994 Hayashi
(Continued)

FOREIGN PATENT DOCUMENTS

CN 101821184 A 9/2010
CN 102753464 A 10/2012
(Continued)

OTHER PUBLICATIONS

Chinese Office Action for Application No. 201910694574.6, Issued Jun. 16, 2021, 13 Pages.

*Primary Examiner* — Jeffrey Donels
(74) *Attorney, Agent, or Firm* — CANTOR COLBURN LLP

(57) ABSTRACT

A method of operating a dispatcher of an elevator group of a building elevator system having a plurality of elevator systems organized into multiple elevator groups including: receiving an elevator call, the elevator call including a desired destination; transmitting elevator status data from the elevator group to one or more other elevator groups of the building elevator system; receiving elevator status data from each of the one or more other elevator groups of the building elevator system; determining a verdict depicting whether an elevator car of the elevator group is best to serve the elevator call in response to the elevator status data of each of the one or more other elevator groups of the building elevator system; and calling an elevator car in response to the verdict.

14 Claims, 3 Drawing Sheets

(51) Int. Cl.

| | |
|---|---|
| ***B66B 1/34*** | (2006.01) |
| ***B66B 1/46*** | (2006.01) |
| ***B66B 3/00*** | (2006.01) |

(52) U.S. Cl.
CPC ........ *B66B 3/002* (2013.01); *B66B 2201/103* (2013.01); *B66B 2201/226* (2013.01); *B66B 2201/4615* (2013.01)

(58) Field of Classification Search
CPC ........ B66B 2201/103; B66B 2201/226; B66B 2201/4615; B66B 2201/30; B66B 2201/301; B66B 1/18; B66B 2201/10
See application file for complete search history.

(56) References Cited

U.S. PATENT DOCUMENTS

| | | | | |
|---|---|---|---|---|
| 5,831,226 | A | 11/1998 | Hattori et al. | |
| 6,345,697 | B1 | 2/2002 | Siikonen | |
| 6,655,501 | B2 | 12/2003 | Kostka | |
| 6,991,068 | B2 | 1/2006 | Siikonen et al. | |
| 7,117,980 | B2 | 10/2006 | Wyss | |
| 7,258,203 | B2 | 8/2007 | De Jong et al. | |
| 7,281,610 | B2 | 10/2007 | Ylinen et al. | |
| 7,360,629 | B2 | 4/2008 | Hagi et al. | |
| 7,537,089 | B2 | 5/2009 | Duenser et al. | |
| 7,559,407 | B2 | 7/2009 | Siikonen et al. | |
| 7,650,966 | B2 | 1/2010 | Sansevero et al. | |
| 8,205,722 | B2 | 6/2012 | Suihkonen | |
| 8,210,321 | B2 | 7/2012 | Finschi et al. | |
| 8,567,569 | B2 | 10/2013 | Suzuki et al. | |
| 8,646,581 | B2 | 2/2014 | Iwata | |
| 9,296,588 | B2 | 3/2016 | Christy et al. | |
| 9,302,885 | B2 * | 4/2016 | Christy ................. | B66B 1/2408 |
| 10,435,272 | B2 * | 10/2019 | Zhang ..................... | B66B 1/468 |
| 10,597,255 | B2 * | 3/2020 | Chapman .............. | B66B 1/3461 |
| 11,027,943 | B2 * | 6/2021 | Stanley ................. | B66B 1/2458 |
| 11,383,954 | B2 * | 7/2022 | Stanley ................. | B66B 1/3446 |
| 2011/0214948 | A1 * | 9/2011 | Suihkonen ............ | B66B 1/2458 187/387 |
| 2013/0168190 | A1 * | 7/2013 | Christy ..................... | B66B 1/06 187/247 |
| 2014/0124302 | A1 * | 5/2014 | Sorsa .................... | B66B 1/2408 187/382 |
| 2016/0090269 | A1 | 3/2016 | Suihkonen et al. | |
| 2017/0291792 | A1 | 10/2017 | Scoville et al. | |
| 2019/0389688 | A1 * | 12/2019 | Stanley ..................... | B66B 1/28 |

FOREIGN PATENT DOCUMENTS

| | | | | |
|---|---|---|---|---|
| CN | 102762475 | A | 10/2012 | |
| CN | 106163958 | A | 11/2016 | |
| DE | 69636282 | T2 | 8/2006 | |
| WO | 2004058616 | A1 | 7/2004 | |
| WO | WO-2007099197 | A1 * | 9/2007 | ........... B66B 1/2458 |

* cited by examiner

SUPER GROUP ARCHITECTURE WITH ADVANCED BUILDING WIDE DISPATCHING LOGIC—DISTRIBUTED GROUP ARCHITECTURE

CROSS-REFERENCE TO RELATED APPLICATIONS

This application claims the benefit of U.S. Provisional Application No. 62/712,348 filed Jul. 31, 2018, which is incorporated herein by reference in its entirety.

BACKGROUND

The subject matter disclosed herein relates generally to the field of elevator systems, and specifically to a method and apparatus for coordinating the operation of multiple elevator cars.

Commonly, elevator cars are organized into elevator groups serving range of landings of a building rather than each elevator car serving the overall length of an elevator shaft to service every floor of a building. Once established, range of landings typically remain unchanged due to physical constraints in the elevator system. In conventional elevator systems, elevator calls may be served by elevator cars in different groups, however the decision of which group would serve the elevator call is based on group wide operating conditions and not on the elevator call destination, which may lead to a non-optimal elevator car being sent to serve the elevator call.

BRIEF SUMMARY

According to an embodiment, a method of operating a dispatcher of an elevator group of a building elevator system having a plurality of elevator systems organized into multiple elevator groups is provided. The method including: receiving an elevator call, the elevator call including a desired destination; transmitting elevator status data from the elevator group to one or more other elevator groups of the building elevator system; receiving elevator status data from each of the one or more other elevator groups of the building elevator system; determining a verdict depicting whether an elevator car of the elevator group is best to serve the elevator call in response to the elevator status data of each of the one or more other elevator groups of the building elevator system; and calling an elevator car in response to the verdict.

In addition to one or more of the features described herein, or as an alternative, further embodiments may include that calling an elevator car in response to the verdict further includes: transmitting the verdict to a redirector of the building elevator system, wherein the redirector is configured to call an elevator car in response to the verdict.

In addition to one or more of the features described herein, or as an alternative, further embodiments may include that the elevator call is routed from the redirector that received the elevator call.

In addition to one or more of the features described herein, or as an alternative, further embodiments may include that the verdict indicates that an elevator car of the elevator group is best to answer the elevator call or that an elevator car of the elevator group is not best to answer the elevator call.

In addition to one or more of the features described herein, or as an alternative, further embodiments may include that the method further comprises: displaying the elevator car of the elevator group that is best to answer the elevator call on the destination entry device.

In addition to one or more of the features described herein, or as an alternative, further embodiments may include: moving the elevator car of the elevator group that is best to answer the elevator call to a landing of the building elevator system to answer the elevator call.

In addition to one or more of the features described herein, or as an alternative, further embodiments may include that the elevator status data is transmitted in response to the elevator call or at selected time intervals.

In addition to one or more of the features described herein, or as an alternative, further embodiments may include that the elevator status data includes at least one of a spare capacity of the elevator group, a source floor's waiting time, a destination floor's service time, whether there is an elevator car available to serve the elevator call immediately, whether the elevator call is already assigned to an elevator car in the elevator group, whether the destination is part of a group of destinations already assigned to the elevator group, building management preferences, a current position of the elevator car, current commitments of the elevator car, a number of stops each passenger assigned to the elevator car will make prior to reaching their destination, how long it will take the elevator car to serve the elevator call, and an impact of adding the elevator call to the elevator car on the other elevator call already assigned to the wait time of the elevator car.

According to another embodiment, a dispatcher of an elevator group of a building elevator system having a plurality of elevator systems organized into multiple elevator groups is provided. The dispatcher including: a processor; and a memory comprising computer-executable instructions that, when executed by the processor, cause the processor to perform operations, the operations including: receiving an elevator call, the elevator call including a desired destination; transmitting elevator status data from the elevator group to one or more other elevator groups of the building elevator system; receiving elevator status data from each of the one or more other elevator groups of the building elevator system; determining a verdict depicting whether an elevator car of the elevator group is best to serve the elevator call in response to the elevator status data of each of the one or more other elevator groups of the building elevator system; and calling an elevator car in response to the verdict.

In addition to one or more of the features described herein, or as an alternative, further embodiments may include calling an elevator car in response to the verdict further includes: transmitting the verdict to a redirector of the building elevator system, wherein the redirector is configured to call an elevator car in response to the verdict.

In addition to one or more of the features described herein, or as an alternative, further embodiments may include that the elevator call is routed from the redirector that received the elevator call.

In addition to one or more of the features described herein, or as an alternative, further embodiments may include that the verdict indicates that an elevator car of the elevator group is best to answer the elevator call or that an elevator car of the elevator group is not best to answer the elevator call.

In addition to one or more of the features described herein, or as an alternative, further embodiments may include that the operations further include: displaying the elevator car of the elevator group that is best to answer the elevator call on the destination entry device.

In addition to one or more of the features described herein, or as an alternative, further embodiments may include: moving the elevator car of the elevator group that is best to answer the elevator call to a landing of the building elevator system to answer the elevator call.

In addition to one or more of the features described herein, or as an alternative, further embodiments may include that the elevator status data is transmitted in response to the elevator call or at selected time intervals.

In addition to one or more of the features described herein, or as an alternative, further embodiments may include that the elevator status data includes at least one of a spare capacity of the elevator group, a source floor's waiting time, a destination floor's service time, whether there is an elevator car available to serve the elevator call immediately, whether the elevator call is already assigned to an elevator car in the elevator group, whether the destination is part of a group of destinations already assigned to the elevator group, building management preferences, a current position of the elevator car, current commitments of the elevator car, a number of stops each passenger assigned to the elevator car will make prior to reaching their destination, how long it will take the elevator car to serve the elevator call, and an impact of adding the elevator call to the elevator car on the other elevator call already assigned to the wait time of the elevator car.

According to another embodiment, a method of operating a dispatcher of an elevator group of a building elevator system having a plurality of elevator systems organized into multiple elevator groups is provided. The method including: receiving an elevator call, the elevator call including a desired destination; transmitting elevator status data from the elevator group to one or more other elevator groups of the building elevator system; receiving elevator status data from each of the one or more other elevator groups of the building elevator system; determining a verdict depicting whether an elevator car of the elevator group is best to serve the elevator call in response to the elevator status data of each of the one or more other elevator groups of the building elevator system; and transmitting the verdict to a redirector of the building elevator system.

In addition to one or more of the features described herein, or as an alternative, further embodiments may include that the elevator call is routed from the redirector that received the elevator call from a destination entry device in communication with the building elevator system.

In addition to one or more of the features described herein, or as an alternative, further embodiments may include that the verdict indicates that an elevator car of the elevator group is best to answer the elevator call or that an elevator car of the elevator group is not best to answer the elevator call.

In addition to one or more of the features described herein, or as an alternative, further embodiments may include that the operations further include: displaying the elevator car of the elevator group that is best to answer the elevator call on the destination entry device.

Technical effects of embodiments of the present disclosure include organizing elevator systems into groups serving a range of landings and determining the optimal elevator car and elevator group to serve the elevator call amongst elevator dispatchers in response to the destination of the elevator call.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
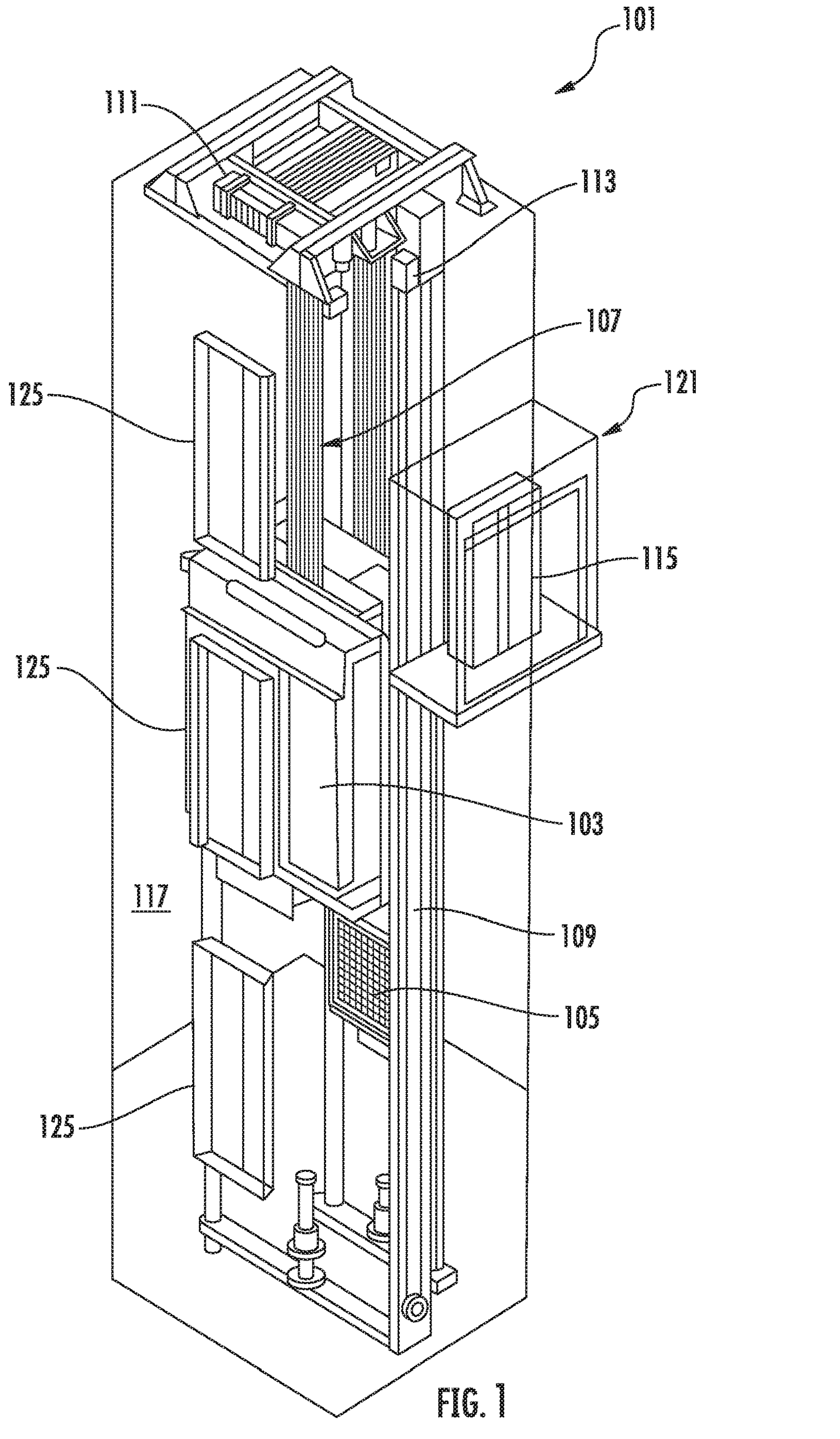
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

Figure 2:
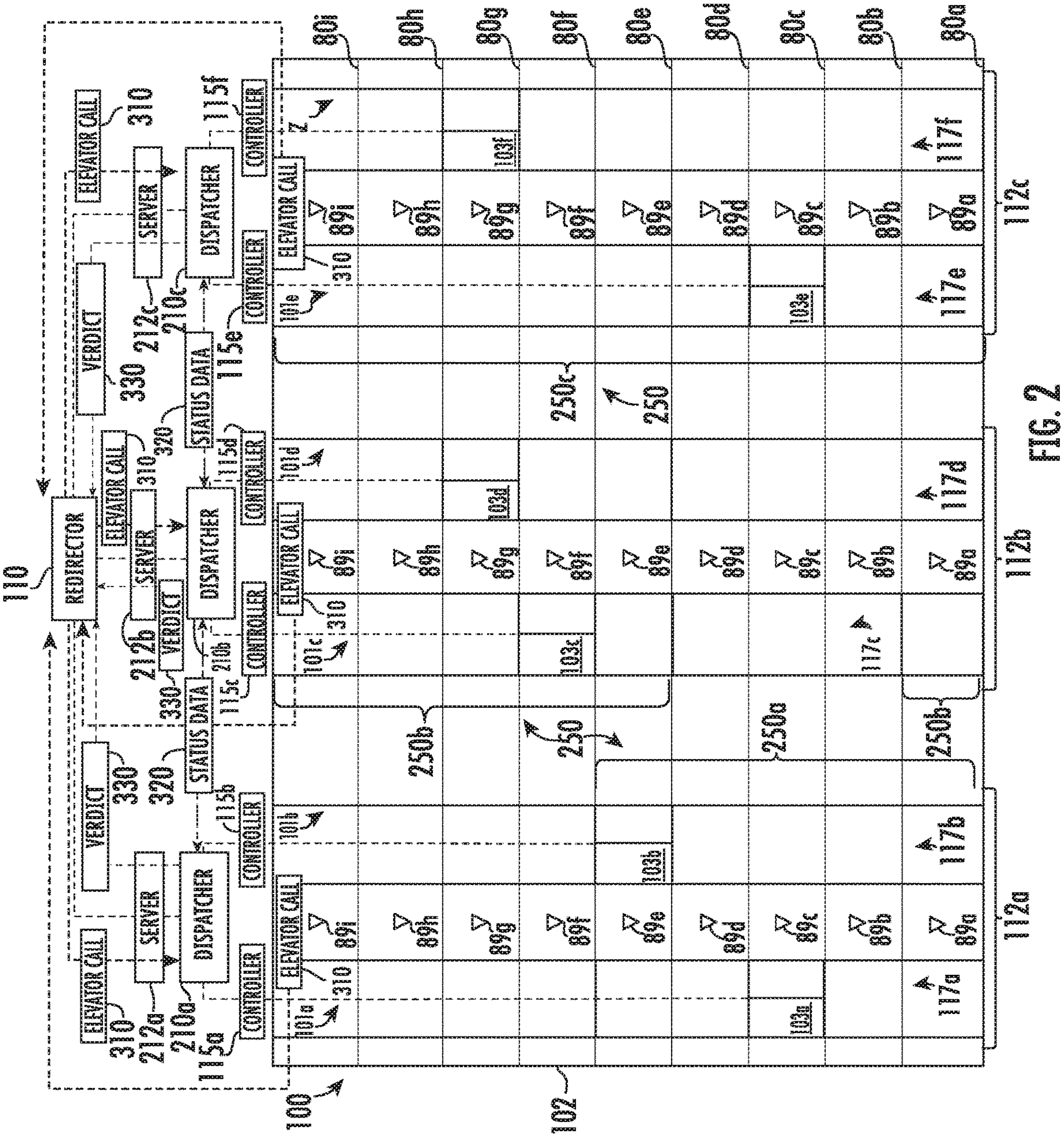
FIG. 2 illustrates a schematic view of a building elevator system, in accordance with an embodiment of the disclosure.

Referring now to FIG. 2 with continued reference to FIG. 1. As seen in FIG. 2, a building elevator system 100 within a building 102 may include multiple different individual elevator systems 101*a*-101*f* organized in elevator groups 112*a*-112*c*. It is understood that while six elevator systems 101*a*-101*f* are utilized for exemplary illustration, embodiments disclosed herein may be applied to building elevator systems 100 having two or more elevator systems 101. It is also understood that while nine floors 80*a*-80*i* are utilized for exemplary illustration, embodiments disclosed herein may be applied to building elevator systems 100 having any number of floors.

Further, the elevator systems 101*a*-101*f* illustrated in FIG. 2 is organized in to three elevator groups 112*a*-112*c* for ease of explanation but it is understood that the elevator systems 101*a*-101*f* organized into one or more elevator groups. Each elevator group 112*a*-112*c* may contain one or more elevator systems 101. During normal operation, a first elevator group 112*a* serves a first range of landings 250*a* (i.e., a lower range of landing) comprising floors 80*a*-80*e*. During normal operation, a second elevator group 112*b* serves a second range of landings 250*b* (i.e., a higher range of landings) comprising floors 80*e*-80*i* and floor 80*a*. During normal operation, a third elevator group 112*c* serves a third range of landings 250*c* (i.e., an entire building range of landings) comprising floors 80*a*-80*i*. It is understood that while each elevator group 112*a*-112*c* serves only one range of landings 250 for exemplary illustration, embodiments disclosed herein may include elevator groups having multiple elevator systems where each elevator system in a single elevator group serves a different range of landings. Moreover, the ranges depicted here are for exemplary purposes only. The elevator system ranges may include any desired number and location of continuous, partially continuous, or non-continuous floors.

Each floor 80*a*-80*i* in the building 102 of FIG. 2 may have a destination entry device 89*a*-89*i*. The elevator destination entry device 89*a*-89*i* sends an elevator call 310 to the redirector 110 including the source of the elevator call 310 and the destination of the elevator call 310. The destination entry device 89*a*-89*i* may serve one or more elevator groups 112*a*-112*c*. The destination entry device 89*a*-89*i* may be a push button (e.g., keypad) and/or a touch screen and may be activated manually or automatically. For example, the elevator call 310 may be sent by an individual entering the elevator call 310 via the destination entry device 89*a*-89*i*. The destination entry device 89*a*-89*i* may also be activated to send an elevator call 310 by voice recognition or a passenger detection mechanism in the hallway, such as, for example a weight sensing device, a visual recognition device, and a laser detection device. The destination entry device 89*a*-89*i* may be activated to send an elevator call 310 through an automatic elevator call system that automatically initiates an elevator call 310 when an individual is determined to be moving towards the elevator system in order to call an elevator or when an individual is scheduled to activate the destination entry device 89*a*-89*i*. The destination entry device 89*a*-89*i* may also be a mobile device configured to transmit an elevator call 310. The mobile device may be a smart phone, smart watch, laptop, or any other mobile device known to one of skill in the art. Each elevator call 310 transmitted from a destination entry device 89*a*-89*i* may be sent to the redirector 110, which distributes the elevator calls 310 to the dispatcher 210*a*-210*c* of each group 112*a*-112*c*. Each group 112*a*-112*c* may have one or more dispatchers 210*a*-210*c*.

The redirector 110 is in communication with the controller 115*a*-115*f* of each elevator system 101*a*-101*f* through a dispatcher 210*a*-210*c* and a server 212*a*-212*c*, as shown in FIG. 2. The redirector 110 may be remote, local, cloud, or any combinations thereof. The dispatchers 210*a*-210*c* may be a 'group' software that is configured to select the best elevator car 103 within the range of landings 250 assigned to the dispatcher 210*a*-210*c*. The dispatcher 210*a*-210*c* may be an electronic controller including a processor and an associated memory comprising computer-executable instructions that, when executed by the processor, cause the processor to perform various operations. The processor may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be but is not limited to a random access memory (RAM), read only memory (ROM), or other electronic, optical, magnetic or any other computer readable medium.

The servers 212*a*-212*c* are similar to a redirector 110 being that the servers 212*a*-212*c* manage the destination entry devices 89*a*-89*i* related to a particular group 112*a*-112*c* (e.g., the redirector 110 interfaces with destination entry devices 89*a*-89*i* that are shared between groups 112*a*-112*c*). In an embodiment, the servers 212*a*-212*c* may be configured to operate as a pass through between the redirector 110 and the dispatcher 210*a*-210*c* associated with the server 212*a*-212*c*.

The controllers 115*a*-115*f* can be combined, local, remote, cloud, etc. The redirector 110 is configured to control and coordinate operation of multiple elevator systems 101*a*-101*f*. The redirector 110 may be an electronic controller including a processor and an associated memory comprising computer-executable instructions that, when executed by the processor, cause the processor to perform various operations. The processor may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be but is not limited to a random access memory (RAM), read only memory (ROM), or other electronic, optical, magnetic or any other computer readable medium.

The redirector 110 is in communication with each of the elevator destination entry devices 89*a*-89*i* of the building elevator system 100, which are shared by more than one group 112*a*-112*c*. The redirector 110 is configured to receive each elevator call 310 transmitted from the elevator destination entry devices 89*a*-89*i* and route the call to the dispatchers 210*a*-210*c* of each elevator group 112*a*-112*c*. The dispatchers 210*a*-210*c* are configured to manage the elevators calls 310 coming in from each destination entry device 89*a*-89*i* and determine among themselves which elevator group 112*a*-112*c* is the best to answer the elevator call 310. Conventional destination entry devices 89*a*-89*i* may be assigned to specific elevator groups 112*a*-112*c* however, the redirector 110 of the present disclosure is configured to allow destination entry devices 89*a*-89*i* to transmit elevator calls 310 to any group 112*a*-112*c*.

When an elevator call 310 is received from any of the destination entry devices 89*a*-89*i*, which may or may not be shared by more than one group 112*a*-112*c*, the redirector 110 transmits the elevator call 310 to the dispatcher 210*a*-210*c* for each elevator group 112*a*-112*c*. The dispatchers 210*a*-210*c* are configured to share current elevator status data 320 with each other dispatcher 210*a*-210*c*. In one embodiment, the dispatchers 210*a*-210*c* may be configured to continuously (e.g., at a selected time interval) share current elevator status data 320 with each other dispatcher 210*a*-210*c*. In another embodiment, the dispatchers 210*a*-210*c* may be configured to share current elevator status data 320 with each other dispatcher 210*a*-210*c* when an elevator call 310 is received. The elevator status data 320 may include a spare capacity of a group 112*a*-112*c* (i.e., how busy the group currently is), the source floor's waiting time, destination floor's service time, if there is an elevator car 103 available to serve this elevator call 310 immediately, if the source/destination elevator call 130 is already assigned to an elevator car 103 in this group (e.g., coincident call), if the destination is part of a group of destinations already assigned to this group (e.g., sectoring), building management preferences (e.g., time of day, external sensors detecting crowds), a current position of the elevator car 103, current commitments of the elevator car 103, a number of stops each passenger assigned to the elevator car 103 will make prior to reaching their destination, how long it will take the elevator car 103 to serve the elevator call 310, and the impact of adding this elevator call 310 to this elevator car 103 on the other elevator call 310 already assigned to the wait time of the elevator car 103.

Once the elevator status data 320 from each other elevator group 112*a*-112*c* is obtained, each dispatcher 210*a*-210*c* will independently determine whether or not they have an elevator car 103 in their group 112*a*-112*c* best capable of serving the elevator call 310 and then transmit the verdict 330 of the elevator group 112*a*-112*c* to the redirector 110. The verdict 330 depicts whether or not the elevator group 112*a*-112*c* will serve the elevator call 310. In one non-limiting example, if the dispatcher 210*a* of the first elevator group 112*a* determines that a first elevator car 103*a* of the first elevator group 112*a* is best capable of serving the elevator call 310 out of all the elevator cars 103*a*-103*f* in all of the elevators groups 112*a*-112*c* then the first dispatcher 210*a* will transmit a verdict 330 to the redirector 110 indicating that the first elevator car 103*a* of the first elevator group 112*a* will answer the elevator call 310. In another non-limiting example, if the dispatcher 210*b* of the second elevator group 112*b* determines that a none of the elevator cars 103*c*,103*d* in the second elevator group 112*b* are best capable of serving the elevator call 310 out of all the elevator cars 103*a*-103*f* in all of the elevators groups 112*a*-112*c* then the second dispatcher 210*b* will transmit a verdict 330 to the redirector 110 indicating that none of the elevator cars 103*c* 103*d* in the second elevator group 112*b* will answer the elevator call 310.

Figure 3:
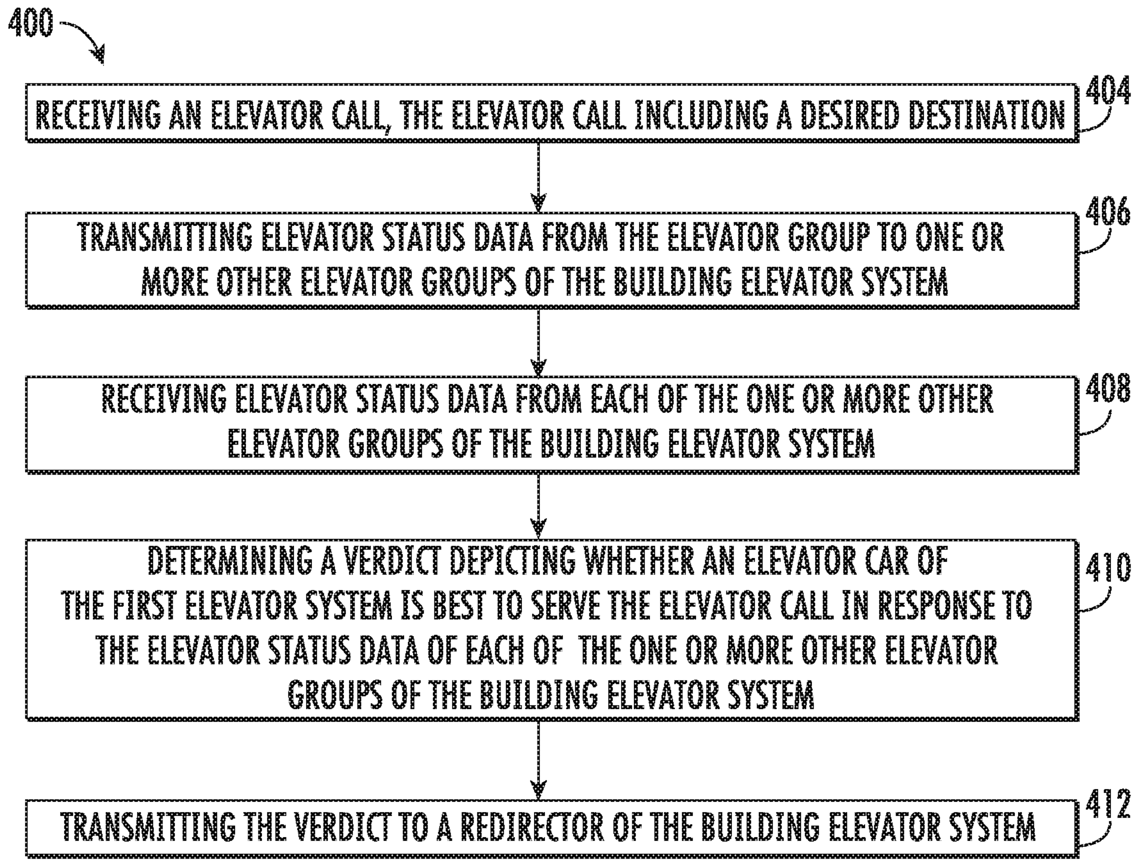
FIG. 3 is a flow chart of method of operating a building elevator system, in accordance with an embodiment of the disclosure.

Referring now to FIG. 3, while referencing components of FIGS. 1 and 2. FIG. 3 shows a flow chart of method 400 of operating a dispatcher 210*a*-210*c* of an elevator group 112*a*-112*c* of a building elevator system 100 having a plurality of elevator systems 101*a*-101*f* organized into multiple elevator groups 112*a*-112*c*, in accordance with an embodiment of the disclosure. In an embodiment, the method 400 may be performed by the dispatcher 210*a*-210*c* of each group 112*a*-112*c*. At block 404, an elevator call 310 is received by the dispatcher. As mentioned above, the elevator call 110 includes a desired destination. As mentioned above, the elevator call 310 may be routed from the redirector 110 that received the elevator call 310 from a destination entry device 89*a*-89*i* in communication with the building elevator system 100. At block 406, elevator status data 320 is transmitted from the elevator group to one or more other elevator groups of the building elevator system 100. The elevator status data 320 may be transmitted in response to the elevator call 310 or at selected time intervals (e.g., every 5 minutes). At block 408, elevator status data 320 is received from each of the one or more other elevator groups of the building elevator system 100.

At block 410, a verdict 330 is determined depicting whether an elevator car of the elevator group is best to serve the elevator call 310 in response to the elevator status data 320 of each of the one or more other elevator groups of the building elevator system 100. At block 412, the verdict 330 is transmitted to a redirector 110 of the building elevator system 100. The verdict 330 may indicate that an elevator car of the elevator group is best to answer the elevator call or that an elevator car of the elevator group is not best to answer the elevator call 310. The method 400 may further include that once an elevator car is determined to the best to answer the elevator call 310 then that elevator car is displayed on the destination entry device 89*a*-89*i* used to make the elevator call 310. The method 400 may also further include: moving the elevator car of the elevator group that is best to answer the elevator call 310 to a landing 125 of the building elevator system 100 to answer the elevator call 310.

While the above description has described the flow process of FIG. 3 in a particular order, it should be appreciated that unless otherwise specifically required in the attached claims that the ordering of the steps may be varied.

As described above, embodiments can be in the form of processor-implemented processes and devices for practicing those processes, such as processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes a device for practicing the embodiments. When implemented on a general-purpose microprocessor, the computer program code segments configure the microprocessor to create specific logic circuits.

The term "about" is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A method of operating a dispatcher of an elevator group of a building elevator system having a plurality of elevator systems organized into multiple elevator groups, the method comprising:

receiving an elevator call routed from a redirector that received the elevator call, the elevator call including a desired destination;

transmitting elevator status data from the elevator group to one or more other elevator groups of the building elevator system;

receiving elevator status data from each of the one or more other elevator groups of the building elevator system;

determining a verdict depicting whether an elevator car of the elevator group is best to serve the elevator call in response to the elevator status data of each of the one or more other elevator groups of the building elevator system; and transmitting the verdict to a redirector of the building elevator system, wherein the redirector is configured to call an elevator car in response to the verdict.

2. The method of claim 1, wherein the redirector receives the elevator call from a destination entry device in communication with the building elevator system.

3. The method of claim 1, wherein the verdict indicates that an elevator car of the elevator group is best to answer the elevator call or that an elevator car of the elevator group is not best to answer the elevator call.

4. The method of claim 3, wherein the method further comprises:

displaying the elevator car of the elevator group that is best to answer the elevator call on the destination entry device.

5. The method of claim 3, further comprising:

moving the elevator car of the elevator group that is best to answer the elevator call to a landing of the building elevator system to answer the elevator call.

6. The method of claim 1, wherein the elevator status data is transmitted in response to the elevator call or at selected time intervals.

7. The method of claim 6, wherein the elevator status data includes at least one of a spare capacity of the elevator group, a source floor's waiting time, a destination floor's service time, whether there is an elevator car available to serve the elevator call immediately, whether the elevator call is already assigned to an elevator car in the elevator group, whether the destination is part of a group of destinations already assigned to the elevator group, building management preferences, a current position of the elevator car, current commitments of the elevator car, a number of stops each passenger assigned to the elevator car will make prior to reaching their destination, how long it will take the elevator car to serve the elevator call, and an impact of adding the elevator call to the elevator car on the other elevator call already assigned to the wait time of the elevator car.

8. A dispatcher of an elevator group of a building elevator system having a plurality of elevator systems organized into multiple elevator groups, the dispatcher comprising:

a processor; and a memory comprising computer-executable instructions that, when executed by the processor, cause the processor to perform operations, the operations comprising:

receiving an elevator call routed from the redirector that received the elevator call, the elevator call including a desired destination;

transmitting elevator status data from the elevator group to one or more other elevator groups of the building elevator system;

receiving elevator status data from each of the one or more other elevator groups of the building elevator system;

determining a verdict depicting whether an elevator car of the elevator group is best to serve the elevator call in response to the elevator status data of each of the one or more other elevator groups of the building elevator system; and transmitting the verdict to a redirector of the building elevator system, wherein the redirector is configured to call an elevator car in response to the verdict.

9. The dispatcher of claim 8, wherein the redirector receives the elevator call from a destination entry device in communication with the building elevator system.

10. The dispatcher of claim 8, wherein the verdict indicates that an elevator car of the elevator group is best to answer the elevator call or that an elevator car of the elevator group is not best to answer the elevator call.

11. The dispatcher of claim 10, wherein the operations further comprise:

displaying the elevator car of the elevator group that is best to answer the elevator call on the destination entry device.

12. The dispatcher of claim 10, further comprising:

moving the elevator car of the elevator group that is best to answer the elevator call to a landing of the building elevator system to answer the elevator call.

13. The dispatcher of claim 8, wherein the elevator status data is transmitted in response to the elevator call or at selected time intervals.

14. The dispatcher of claim 8, wherein the elevator status data includes at least one of a spare capacity of the elevator group, a source floor's waiting time, a destination floor's service time, whether there is an elevator car available to serve the elevator call immediately, whether the elevator call is already assigned to an elevator car in the elevator group, whether the destination is part of a group of destinations already assigned to the elevator group, building management preferences, a current position of the elevator car, current commitments of the elevator car, a number of stops each passenger assigned to the elevator car will make prior to reaching their destination, how long it will take the elevator car to serve the elevator call, and an impact of adding the elevator call to the elevator car on the other elevator call already assigned to the wait time of the elevator car.

* * * * *